United States Patent
Mirassou (10) Patent No.: US 9,658,127 B2
(45) Date of Patent: May 23, 2017

(54) MEASUREMENT AMPLIFYING CIRCUIT FOR PIEZOELECTRIC SENSOR POSITIONED IN AN INTERNAL COMBUSTION ENGINE

(71) Applicants: CONTINENTAL AUTOMOTIVE FRANCE, Toulouse (FR); CONTINENTAL AUTOMOTIVE GMBH, Hannover (DE)

(72) Inventor: David Mirassou, Toulouse (FR)

(73) Assignees: CONTINTENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 181 days.

(21) Appl. No.: 14/432,764

(22) PCT Filed: Aug. 26, 2013

(86) PCT No.: PCT/EP2013/002563
§ 371 (c)(1),
(2) Date: Apr. 1, 2015

(87) PCT Pub. No.: WO2014/053205
PCT Pub. Date: Apr. 10, 2014

(65) Prior Publication Data
US 2015/0323406 A1    Nov. 12, 2015

(30) Foreign Application Priority Data

Oct. 5, 2012 (FR) .......... 12 59472

(51) Int. Cl.
G01M 15/08 (2006.01)
G01L 23/10 (2006.01)
G01L 23/22 (2006.01)

(52) U.S. Cl.
CPC .......... *G01L 23/10* (2013.01); *G01L 23/222* (2013.01); *G01L 23/225* (2013.01)

(58) Field of Classification Search
USPC .......... 73/114.16, 114.18
See application file for complete search history.

(56) References Cited

U.S. PATENT DOCUMENTS 4,047,122 A   9/1977  Rao
6,496,721 B1  12/2002 Yonce
(Continued)

FOREIGN PATENT DOCUMENTS

CN    102210098 A    10/2011
WO   2010/056236 A1  5/2010

OTHER PUBLICATIONS

International Search Report, dated Oct. 22, 2013, from corresponding PCT application, PCT/EP2013/002563.
(Continued)

*Primary Examiner* — Eric S McCall
(74) *Attorney, Agent, or Firm* — Young & Thompson (57) ABSTRACT

A measurement amplifying circuit (400) for a piezo-electric sensor (100) positioned in an internal combustion engine supplying a signal to be measured, includes: a module (420) for generating a common mode voltage; a differential amplifier (410); and a subtraction module (430). The module (420) for generating a common mode voltage is to be connected to a wall (111) of the engine, the module (420) for generating a common mode voltage being suitable for supplying a common mode voltage signal (Vcm) reproducing the variations of an engine signal (Sb) received from the wall (111) of the engine.

19 Claims, 3 Drawing Sheets

(56) References Cited

U.S. PATENT DOCUMENTS

| | | | | |
|---|---|---|---|---|
| 6,513,383 B1* | 2/2003 | Okano | ............... | B60R 21/013 |
| | | | | 73/514.34 |
| 8,733,157 B2* | 5/2014 | Itou | ............... | G01L 23/10 |
| | | | | 73/114.16 |
| 2007/0101814 A1 | 5/2007 | Campbell et al. | | |
| 2009/0120164 A1 | 5/2009 | Anilkumar et al. | | |
| 2013/0002358 A1* | 1/2013 | Mitchell | ............... | G01D 3/036 |
| | | | | 330/289 |
| 2013/0036803 A1* | 2/2013 | Itou | ............... | G01L 23/10 |
| | | | | 73/114.18 |
| 2015/0204745 A1* | 7/2015 | Marrota | ............... | G01L 27/007 |
| | | | | 73/720 |
| 2016/0252578 A1* | 9/2016 | Vanoli | ............... | G01R 31/343 |
| | | | | 324/765.01 |

OTHER PUBLICATIONS

Maxim IC COM: Application Note 1127: "Amplifier Provides Signal Conditioning for Piezofilm Sensor", Jun. 26, 2002, pp. 1-2.

* cited by examiner

MEASUREMENT AMPLIFYING CIRCUIT FOR PIEZOELECTRIC SENSOR POSITIONED IN AN INTERNAL COMBUSTION ENGINE

The invention relates to an improved measurement amplifying circuit for a piezoelectric sensor positioned in an internal combustion engine. The invention is more particularly, but not exclusively, adapted to the field of pressure measurement in internal combustion engines.

Figure 1:
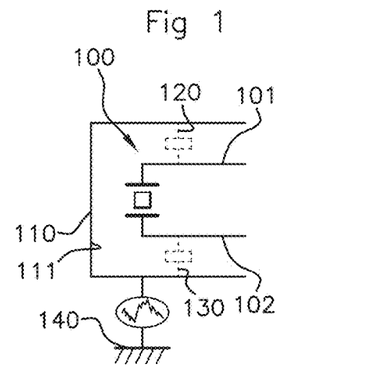
FIG. 1 shows a schematic representation of a piezoelectric pressure sensor positioned inside a cylinder of an engine.

FIG. 1 shows schematically a piezoelectric pressure sensor 100 positioned inside a cylinder 110 of an internal combustion engine. The engine cylinder 110 is connected to an engine ground. The sensor 100 measures the pressure in a combustion chamber of the engine. Said piezoelectric pressure sensor 100 delivers a signal Sc to be measured (not shown in FIG. 1). This signal Sc to be measured is differential and is equivalent to an electrical charge proportional to the pressure present in the combustion chamber of the internal combustion engine.

Figure 2:
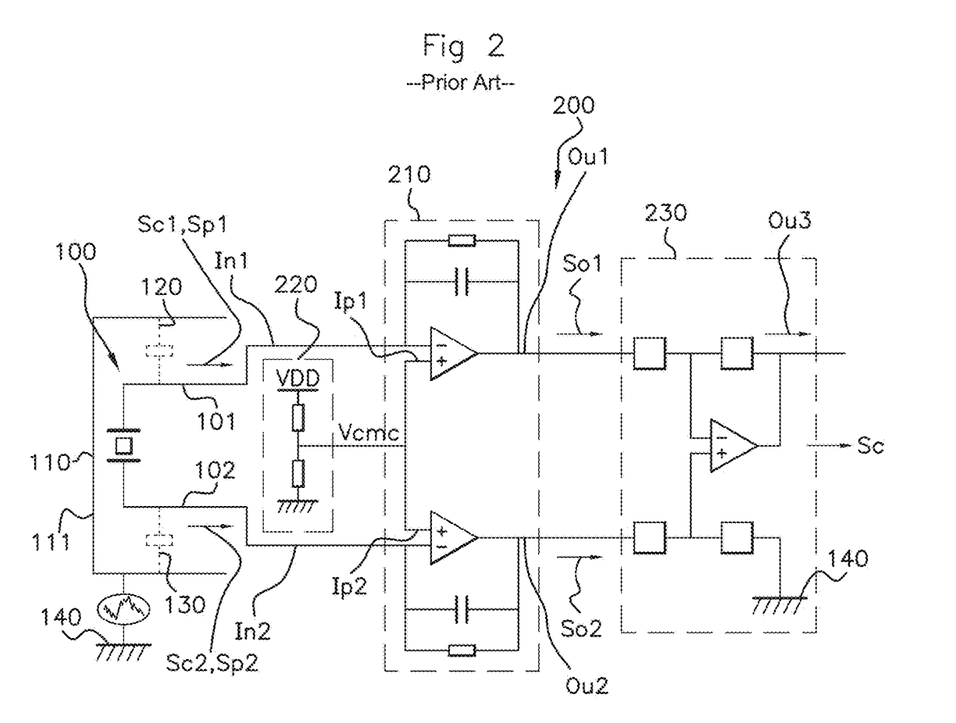
FIG. 2 shows a schematic representation of the sensor of FIG. 1 associated with a measurement amplifying circuit according to the prior art.

According to the prior art, the sensor 100 is associated with a measurement amplifying circuit 200 for amplifying the signal Sc to be measured (see FIG. 2). Said circuit 200 comprises a differential amplifier 210, a common-mode voltage generation module 220, referred to hereafter as a generator module 220, and a subtraction module 230.

The differential amplifier 210 is an intermediate module, providing impedance matching and charge-to-voltage conversion between the sensor 100 and the subtraction module 230. For this purpose, said differential amplifier 210 has two inputs In1 and In2, connected respectively to a first terminal 101 and a second terminal 102 of the sensor 100, two inputs Ip1 and Ip2 connected to the generator module 220, and two outputs Ou1 and Ou2 connected to the subtraction module 230. The generator module 220 is connected to a voltage source VDD and delivers a continuous common-mode voltage signal Vcmc, equal to the voltage VDD divided by two, to the inputs Ip1 and Ip2 connected to the generator module 220. In theory, the sensor 100 delivers a first signal Sc1, in the form of electrical charges, to the input In1 of the differential amplifier 210 connected to the sensor 100, and a second signal Sc2, in the form of electrical charges, to the other input In2 of the differential amplifier 210 connected to the sensor 100. The signal Sc to be measured is equal to the difference between the first signal Sc1 delivered by the sensor 100 and the second signal Sc2 delivered by the sensor 100. The first output Ou1 of the differential amplifier 210 delivers a first output signal So1, equal to a voltage equivalent to the electrical charges of the first signal Sc1 delivered by the sensor 100, and the second output Ou2 of the differential amplifier 210 delivers a second output signal So2, this signal being equal to a voltage equivalent to the electrical charges of the second signal Sc2 delivered by the sensor 100.

The subtraction module 230 makes it possible to amplify a signal So (not shown) equal to the potential difference between the second output signal So2 and the first output signal So1. The module 230 also rejects the common part of said output signals So1 and So2.

In practice, however, a first parasitic signal Sp1 and a second parasitic signal Sp2, equivalent to parasitic charges, are superimposed, respectively, on the first signal Sc1 and the second signal Sc2 delivered by the sensor 100. The signal Sp1 takes the form of:

$$Sp1 = C1 * \frac{d(Vm - Ve)}{dt}$$

where C1 is the capacitance of a first parasitic capacitive element 120 and $$\frac{d(vM - Ve)}{dt}$$

is the derivative with respect to time of the potential difference between the ground of the internal combustion engine Vm and the electrical ground Ve 140 of the sensor. Similarly, the signal Sp2 takes the form of:

$$Sp2 = C2 * \frac{d(Vm - Ve)}{dt}$$

where C2 is the capacitance of a second parasitic capacitive element 130 and $$\frac{d(vM - Ve)}{dt}$$

is the derivative with respect to time of the potential difference between the engine ground Vm and the electrical ground Ve 140. Said parasitic capacitive elements 120, 130 are created by a reduced space between an inner wall 111 of the cylinder 110 of the engine and terminals 101, 102 of the sensor 100 (see FIG. 1).

The circuit 200 enables the parasitic signals Sp1 and Sp2 to be suppressed solely in the case in which said parasitic signals Sp1 and Sp2 are identical. However, the capacitance C1 of the first parasitic capacitive element 120 is rarely identical to the capacitance C2 of the second parasitic capacitive element 130. The difference between the two parasitic signals Sp1 and Sp2 is then amplified in the same way as the signal Sc to be measured, which falsifies the resulting measurement.

Figure 3:
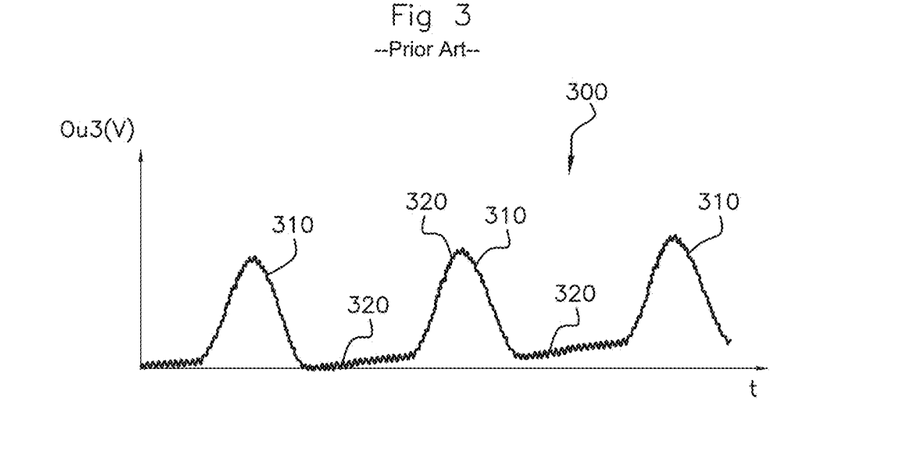
FIG. 3 shows a schematic representation of an output signal of the measurement amplifying circuit of FIG. 2.

FIG. 3 shows a curve 300 corresponding to an output signal Ou3 obtained at the output of the circuit 200 with respect to the time t. The signal Ou3 is representative of the signal Sc. This curve 300 has voltage peaks 310 corresponding to peaks of pressure in the combustion chamber of the engine. Said curve 300 further comprises variations 320 corresponding to the difference between the two parasitic signals Sp1 and Sp2, these variations falsifying the measurement by about ten millivolts.

The object of the invention is, notably, to overcome this problem.

To this end, the invention relates to a measurement amplifying circuit for a piezoelectric sensor positioned in an internal combustion engine and delivering a signal to be measured, said circuit including:
  a common-mode voltage generation module,
  a differential amplifier comprising a first operational amplifier having a first input connected to a first terminal of the piezoelectric sensor, a second input connected to an output of the common-mode voltage generation module, and an output, said differential amplifier comprising a second operational amplifier having a first input connected to a second terminal of the piezoelectric sensor, a second input connected to the output of the common-mode voltage generation module, and an output, a subtraction module comprising an operational amplifier connected to the outputs of the first and second operational amplifiers of the differential amplifier, the circuit being characterized in that the common-mode voltage generation module is to be connected to a wall of the engine, said common-mode voltage generation module being adapted to deliver a common-mode voltage signal reproducing the variations of an engine signal received from said engine wall.

The invention may be applied according to the advantageous embodiments described below, which may be considered individually or in any technically feasible combination.

Advantageously, the common-mode voltage generation module comprises a high-pass filter to be connected to the engine wall, said high-pass filter being adapted to suppress the continuous component of the engine signal received from said engine wall and to allow the passage of at least some of the variations of said engine signal whose frequencies are included in a useful frequency band of the signal to be measured.

Advantageously, the high-pass filter of the common-mode voltage generation module comprises a first resistance, a second resistance and a capacitive element, whose first terminal is connected to the resistances and whose second terminal is to be connected to the engine wall.

Advantageously,
- a first terminal of the first resistance is connected to a voltage source,
- a second terminal of the first resistance is connected to a first terminal of the second resistance, to a first terminal of the capacitive element, and to the output of the common-mode voltage generation module,
- a second terminal of the second resistance is connected to an electrical ground.

Advantageously, the high-pass filter has a cut-off frequency lower than the minimum frequency of the useful frequency band of the signal to be measured.

Advantageously, an EMC (electromagnetic compatibility) filter is connected in series with the common-mode voltage generation module.

Advantageously,
- the output of the first operational amplifier of the differential amplifier is connected to the first input of said first operational amplifier via a negative feedback loop comprising a capacitive element connected in parallel with a resistance, and
- the output of the second operational amplifier of the differential amplifier is connected to the first input of said second operational amplifier via a negative feedback loop comprising a capacitive element connected in parallel with a resistance.

The invention also relates to a measurement amplifying method for a piezoelectric sensor positioned in an engine, to be executed by the circuit according to the invention, the method being characterized in that it comprises the steps of:

a) delivering a first noisy signal to the first input of the first operational amplifier of the differential amplifier and a second noisy signal to the first input of the second operational amplifier of the differential amplifier, each noisy signal being formed by a sensor signal and a superimposed parasitic signal,
the difference between the sensor signals being equivalent to the signal to be measured, b) filtering an engine signal to create the common-mode voltage signal according to the variations of the engine signal, and c) applying the common-mode voltage signal to the second inputs of each operational amplifier of the differential amplifier, so as to maintain a fixed voltage at the terminals of the parasitic capacitive elements, in such a way that the parasitic capacitive elements do not emit parasitic charges.

The method proposed by the invention may be executed according to the advantageous embodiments described below, which may be considered individually or in any technically feasible combination.

Advantageously, the method comprises, after step c), the steps of:

d) subtracting a first output signal obtained at the output of the first amplifier of the differential amplifier from a second output signal obtained at the output of the second amplifier of the differential amplifier, in order to obtain a signal to be amplified that is equivalent to the signal to be measured without a parasitic signal, and e) amplifying the signal to be amplified.

Advantageously, the method comprises, before step b), the steps of:

f) filtering the first and second noisy signals for frequencies above a frequency threshold, and g) filtering an engine signal for frequencies above the frequency threshold.

The invention will be more clearly understood from the following description which is provided by way of non-limiting example, and which refers to the drawings, in which.

In these figures, references which are identical from one figure to another denote identical or similar elements. For the sake of clarity, the elements represented are not to scale unless specified otherwise.

Figure 4:
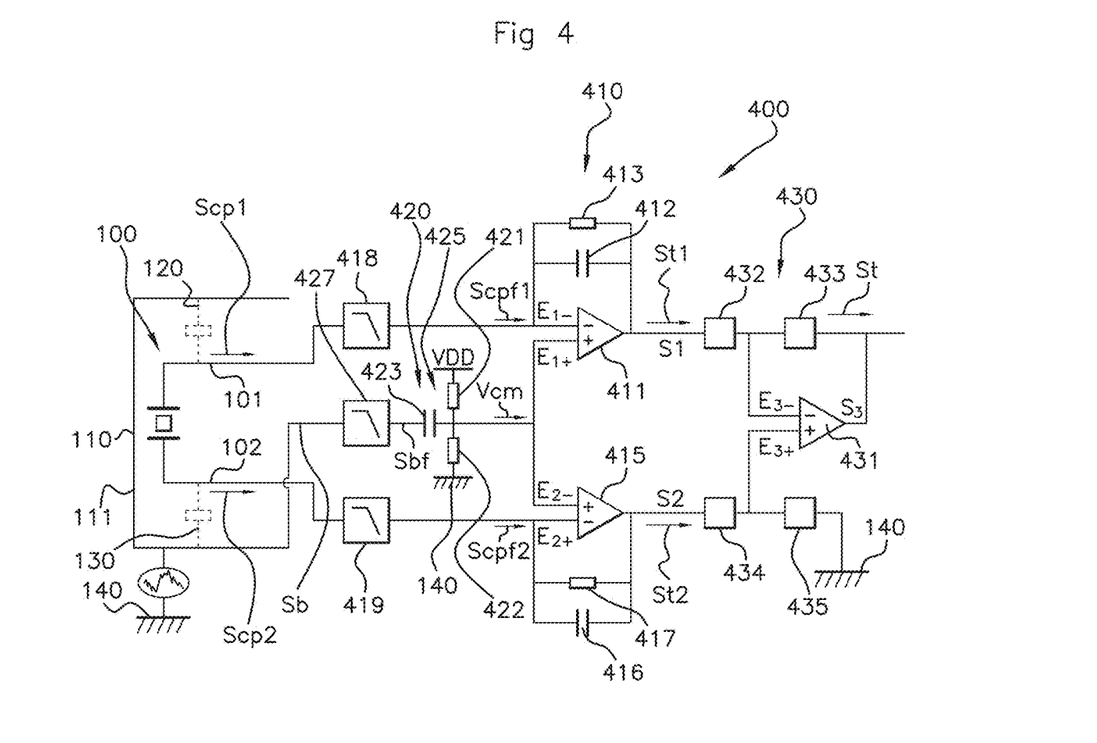
FIG. 4 shows a schematic representation of the sensor of FIG. 1 associated with an improved measurement amplifying circuit according to an exemplary embodiment of the invention.

The piezoelectric pressure sensor 100 of FIG. 1 is associated with an improved measurement amplifying circuit 400 (see FIG. 4). Said circuit 400 comprises a differential amplifier 410, a common-mode voltage generation module 420, referred to hereafter as a generator module 420, and a subtraction module 430.

The differential amplifier 410 is an intermediate module, providing impedance matching and charge-to-voltage conversion between the sensor 100 and the subtraction module 430. The generator module 420 delivers a common-mode voltage Vcm to the inputs of the differential amplifier 410.

The subtraction module 430 makes it possible to amplify the difference between two signals received from the differential amplifier 410, and to reject the common part of said signals.

More precisely, the differential amplifier comprises a first operational amplifier 411 having a non-inverting input E1+, an inverting input E1−, and an output S1. The inverting input E1− is connected to the first terminal 101 of the sensor 100. The output S1 is connected to the inverting input E1− via a negative feedback loop comprising a capacitive element 412 connected in parallel with a resistance 413. The output S1 is also connected to a first input of the subtraction module 430. The non-inverting input E1+ is connected to the output of the generator module 420. The differential amplifier 410 further comprises a second operational amplifier 415 having a non-inverting input E2+, an inverting input E2−, and an output S2. The inverting input E2− is connected to the second terminal 102 of the sensor 100. The output S2 is connected to the inverting input E2− via a negative feedback loop comprising a capacitive element 416 connected in parallel with a resistance 417. The non-inverting input E2+ is connected to the output of the generator module 420. The amplifiers 411 and 415 are supplied by a voltage source VDD. In a variant, a first EMC (Electromagnetic Compatibility) filter 418 is connected between the inverting input E1− of the first amplifier 411 and the first terminal 101 of the sensor 100, and a second EMC filter 419 is connected between the inverting input E2− of the second amplifier 415 and the second terminal 102 of the sensor 100.

Said generator module 420 comprises two resistances 421 and 422 and a capacitive element 423. A first terminal of the first resistance 421 is connected to a voltage source VDD, while the second terminal of said first resistance 421 is connected to a first terminal of the second resistance 422, to a first terminal of the capacitive element 423, and to the output of the module 420. The second terminal of the second resistance 422 is connected to the electrical ground 140. The second terminal of the capacitive element 423 is connected to the cylinder 110 of the engine via a wall 111 of the cylinder 110. The resistances 421 and 422, together with the capacitive element 423, form a high-pass filter 425. Said high-pass filter 425 has a cut-off frequency Fc lower than the lowest frequency of the useful frequency band of the signal Sc to be measured. In an example, the cut-off frequency Fc is less than four hertz. In an example, the cut-off frequency Fc is defined by the formula:

$$Fc = \frac{\pi * Rp * Cp}{4}$$

where Rp is the resistance in ohms of each resistance 421, 422 and Cp is the capacitance in farads of the capacitive element 423. In a variant, the generator module 420 has no high-pass filter 425, and the improved measurement amplifying circuit 400 is connected to a symmetrical power supply.

In a variant, a third EMC filter 427 is connected between the capacitive element 423 and the cylinder 110 of the engine, or more precisely the wall 111 of the cylinder 110.

The subtraction module 430 comprises an operational amplifier 431 having a non-inverting input E3+, an inverting input E3−, and an output S3. The subtraction module 430 further comprises four resistances 432, 433, 434 and 435. A first terminal of the first resistance 432 is connected to the output S1 of the first amplifier 411 of the differential amplifier 410. The second terminal of the first resistance 432 is connected to the inverting input E3− of the amplifier 431 of the subtraction module 430 and to a first terminal of the second resistance 433. The second terminal of the second resistance 433 is connected to the output S3 of the amplifier 431 of the subtraction module 430. A first terminal of the third resistance 434 is connected to the output S2 of the second amplifier 415 of the differential amplifier 410. The second terminal of the third resistance 434 is connected to the non-inverting input E3+ of the amplifier 431 of the subtraction module 430 and to a first terminal of the fourth resistance 435. The second terminal of the fourth resistance 435 is connected to the electrical ground 140.

Figure 6:
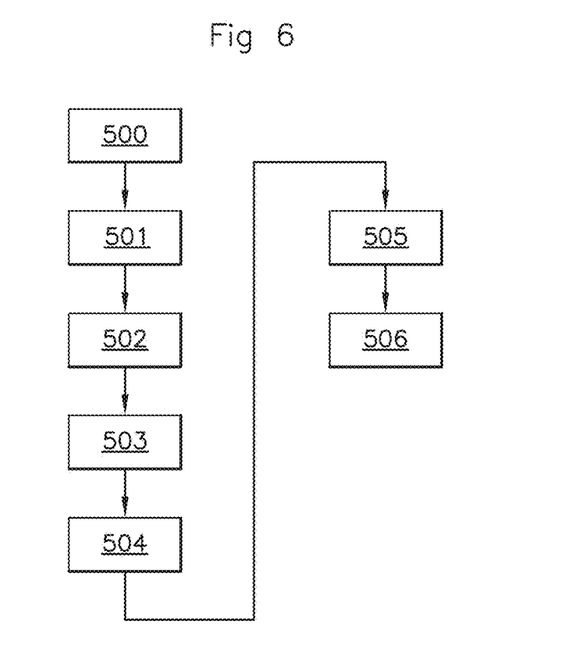
FIG. 6 shows a functional diagram of different steps in the method according to an exemplary embodiment of the invention.

In one implementation, the sensor 100 delivers, in a step 500 (see FIG. 6), a first noisy signal Scp1 to the inverting input E1− of the first operational amplifier 411 of the differential amplifier 410 and a second noisy signal Scp2 to the inverting input E2− of the second operational amplifier 411 of the differential amplifier 410.

Said first noisy signal Scp1 is formed by the first sensor signal Sc1 and a superimposed first parasitic signal Sp1 equivalent to parasitic charges. The first parasitic signal Sp1 takes the following form:

$$Sp1 = C1 * \frac{d(Vm - Ve)}{dt}$$

where C1 is the capacitance of the first parasitic capacitive element 120 and $$\frac{d(vM - Ve)}{dt}$$

is the derivative with respect to time of the potential difference between the engine ground Vm and the electrical ground Ve 140. The first parasitic capacitive element 120 is created by a reduced space between an inner wall 111 of the cylinder 110 of the engine and the first terminal 101 of the sensor 100.

Similarly, said second noisy signal Scp2 is formed by the second sensor signal Sc2 and a superimposed second parasitic signal Sp2 equivalent to parasitic charges. The second parasitic signal Sp2 takes the following form:

$$Sp2 = C2 * \frac{d(Vm - Ve)}{dt}$$

where C2 is the capacitance of a second parasitic capacitive element 130 and $$\frac{d(vM - Ve)}{dt}$$

is the derivative with respect to time of the potential difference between the engine ground Vm and the electrical ground Ve 140. The second parasitic capacitive element 130 is created by a reduced space between an inner wall 111 of the cylinder 110 of the engine and the second terminal 102 of the sensor 100. As explained above, the parasitic signals Sp1 and Sp2 are rarely identical, because the capacitance C1 of the first parasitic capacitive element 120 is rarely identical to the capacitance C2 of the second parasitic capacitive element 130.

In a step 501, the first noisy signal Scp1 is filtered by the first EMC filter 418 and the second noisy signal Scp2 is filtered by the second EMC filter 419, for frequencies above a frequency threshold Sf1, in order to suppress electromagnetic interference.

In a step 502, an engine signal Sb, induced by the potential difference between the electrical ground 140 and the engine ground, is filtered by the third EMC filter 427, for frequencies above a frequency threshold Sf1, in order to suppress electromagnetic interference. The engine signal Sb is found at a first terminal of each parasitic capacitive element 120, 130.

The frequency band of the useful information of the noisy signals Scp1 and Scp2, and therefore of the sensor signals Sc1, Sc2, the parasitic signals Sp1, Sp2 and the engine signal Sb, extends from four hertz to forty kilohertz. This frequency band is equivalent to the possible frequency band of the compression peaks in the cylinder 110 according to the engine speed. The frequency threshold Sf1 is greater than the maximum frequency of the frequency band of the useful information of the noisy signals Scp1 and Scp2. In an example, the frequency threshold Sf1 is substantially equal to ten megahertz. The EMC filters 418, 419, 427 do not interfere with the noisy signals Scp1, Scp2 and the engine signal Sb in the useful band of said signals Scp1, Scp2 and the engine signal Sb, and therefore they resemble direct connections.

In a step 503, the high-pass filter 425 filters a signal Sbf equivalent to the signal Sb filtered by the EMC filter 427, for frequencies above the cut-off frequency Fc of the high-pass filter 425. Thus the high-pass filter 425 enables the continuous component of said signal Sbf to be suppressed, while allowing the passage of the potential variations of said signal Sbf. The common-mode voltage signal Vcm is obtained at the output of the high-pass filter 425. This common-mode voltage signal Vcm follows the potential variations of the engine signal Sb, and is centered on a continuous voltage for the frequency band of the useful information of the signals. In an example, this continuous voltage is equal to the voltage VDD divided by two. In an example, this continuous voltage is equal to 1.5 volts.

In a step 504, the common-mode voltage signal Vcm is applied to the non-inverting inputs E1+ and E2+ of the amplifiers 411 and 415 of the differential amplifier 410. The common-mode voltage signal Vcm is then obtained at the inverting inputs E1− and E2− of the amplifiers 411 and 415 of the differential amplifier 410, and consequently at a second terminal of each parasitic capacitive element 120, 130. The engine signal Sb is found at the first terminal of each parasitic capacitive element 120, 130. The voltages Vc1, Vc2 at the terminals of the parasitic capacitive elements 120, 130 are therefore equivalent to the common-mode voltage signal Vcm from which the engine signal Sb is subtracted. Since the common-mode voltage signal Vcm follows the variations of the engine signal Sb, the voltages Vc1, Vc2 at the terminals of the parasitic capacitive elements 120, 130 are fixed. Consequently, the parasitic capacitive elements 120, 130 no longer emit any parasitic charges C1, C2. The parasitic signals Sp1 and Sp2 are therefore equal.

The output S1 of the first amplifier 411 of the differential amplifier 410 delivers a first output signal St1, and the output S2 of the second amplifier 415 of the differential amplifier 410 delivers a second output signal St2.

In a step 505, the subtraction module 430 subtracts the first output signal St1 from the second output signal St2 in order to obtain a signal St to be amplified. Said signal St to be amplified is thus equivalent to the potential difference between the second output signal St2 and the first output signal St1. The subtraction module 430 also rejects the common part of said output signals St1 and St2. Since the parasitic signals Sp1 and Sp2 are equal, they are rejected. The signal St to be amplified is substantially equivalent to the signal Sc to be measured without a parasitic signal.

In a step 506, the subtraction module 430 amplifies the signal St to be amplified.

In a variant, steps 501 and 502 are omitted and the high-pass filter 425 filters the engine signal Sb directly in step 503.

Figure 5:
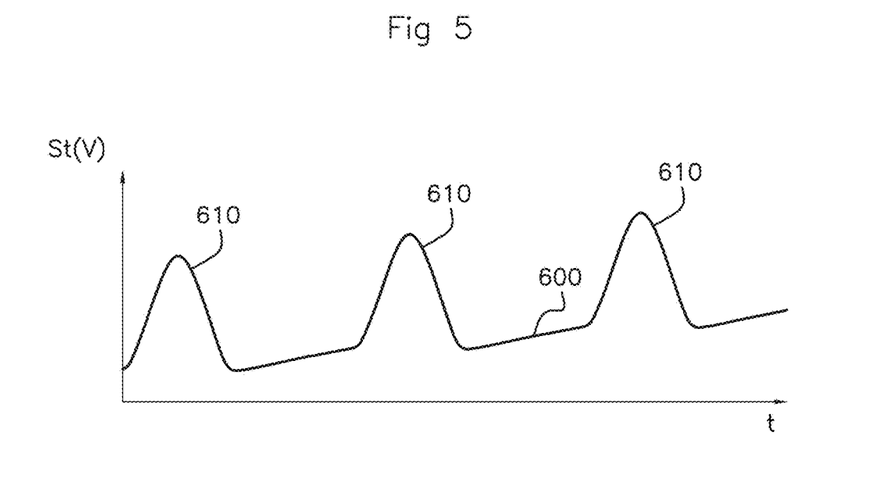
FIG. 5 shows a graphic representation of an output signal of the improved measurement amplifying circuit of FIG. 4.

FIG. 5 shows a curve 600 corresponding to an output signal St obtained at the output of the circuit 400, as a function of the time t. This curve has voltage peaks 610 corresponding to peaks of pressure in the combustion chamber of the engine. The variations 320 corresponding to the injected parasitic charges of the curve 300 no longer appear in the curve 600. The measurement of the sensor 100 is therefore no longer falsified when the device and method of the invention are used.

The invention claimed is:

1. A measurement amplifying circuit (400) for a piezoelectric sensor (100) positioned in an internal combustion engine and delivering a signal (Sc) to be measured, said circuit including:
   a common-mode voltage generation module (420),
   a differential amplifier (410) comprising a first operational amplifier (411) having a first input (E1−) connected to a first terminal (101) of the piezoelectric sensor (100), a second input (E1+) connected to an output of the common-mode voltage generation module (420), and an output (S1), said differential amplifier (410) comprising a second operational amplifier (415) having a first input (E2−) connected to a second terminal (102) of the piezoelectric sensor (100), a second input (E2+) connected to the output of the common-mode voltage generation module (420), and an output (S2),
   a subtraction module (430) comprising an operational amplifier (431) connected to the outputs (S1, S2) of the first and second operational amplifiers (411, 415) of the differential amplifier (410),
wherein the common-mode voltage generation module (420) is to be connected to a wall (111) of the engine, said common-mode voltage generation module (420) being adapted to deliver a common-mode voltage signal (Vcm) reproducing the variations of an engine signal (Sb) received from said engine wall (111).

2. The circuit as claimed in claim 1, wherein the common-mode voltage generation module (420) comprises a high-pass filter (425) to be connected to the engine wall (111), said high-pass filter (425) being adapted to suppress the continuous component of the engine signal (Sb) received from said engine wall (111) and to allow the passage of at least some of the variations of said engine signal (Sb) whose frequencies are included in a useful frequency band of the signal (Sc) to be measured.

3. The circuit as claimed in claim 2, characterized in that the high-pass filter (425) of the common-mode voltage generation module (420) comprises a first resistance (421), a second resistance (422) and a capacitive element (423), whose first terminal is connected to the resistances (421, 422) and whose second terminal is to be connected to the engine wall (111).

4. The circuit as claimed in claim 3, wherein:
a first terminal of the first resistance (421) is connected to a voltage source (VDD),
a second terminal of the first resistance (421) is connected to a first terminal of the second resistance (422), to a first terminal of the capacitive element (423), and to the output of the common-mode voltage generation module (420), and
a second terminal of the second resistance (422) is connected to the electrical ground (140).

5. The circuit as claimed in claim 2, wherein the high-pass filter (425) has a cut-off frequency (Fc) lower than the minimum frequency of the useful frequency band of the signal (Sc) to be measured.

6. The circuit as claimed in claim 1, wherein an EMC filter (427) is connected in series with the common-mode voltage generation module (420).

7. The circuit as claimed in claim 1, wherein:
the output (S1) of the first operational amplifier (411) of the differential amplifier (410) is connected to the first input (E1−) of said first operational amplifier (411) via a negative feedback loop comprising a capacitive element (412) connected in parallel with a resistance (413), and
the output (S2) of the second operational amplifier (415) of the differential amplifier (410) is connected to the first input (E2−) of said second operational amplifier (415) via a negative feedback loop comprising a capacitive element (416) connected in parallel with a resistance (417).

8. A measurement amplifying method for a piezoelectric sensor (100) positioned in an internal combustion engine, to be executed by the circuit as claimed in claim 1, which comprises the steps of:
a) delivering (500) a first noisy signal (Scp1) to the first input (E1−) of the first operational amplifier (411) of the differential amplifier (410) and a second noisy signal (Scp2) to the first input (E2−) of the second operational amplifier (411) of the differential amplifier (410),
each noisy signal (Scp1, Scp2) being formed by a sensor signal (Sc1, Sc2) and a superimposed parasitic signal (Sp1, Sp2),
the difference between the sensor signals (Sc1, Sc2) being equivalent to the signal (Sc) to be measured,
b) filtering (503) an engine signal (Sb, Sbf) to create the common-mode voltage signal (Vcm) according to the variations of the engine signal (Sb, Sbf), and
c) applying (504) the common-mode voltage signal (Vcm) to the second inputs (E1+, E2+) of each operational amplifier (411, 415) of the differential amplifier (410), so as to maintain a fixed voltage (Vc1, Vc2) at the terminals of the parasitic capacitive elements (120, 130), in such a way that the parasitic capacitive elements do not emit parasitic charges (C1, C2).

9. The method as claimed in claim 8, further comprising, after step c), the steps of:
d) subtracting (505) a first output signal (St1) obtained at the output of the first amplifier (411) of the differential amplifier (410) from a second output signal (St2) obtained at the output of the second amplifier (415) of the differential amplifier (410), in order to obtain a signal (St) to be amplified that is equivalent to the signal (Sc) to be measured without a parasitic signal, and
e) amplifying (506) the signal (St) to be amplified.

10. The method as claimed in claim 8, further comprising, before step b), the steps of:
f) filtering (501) the first and second noisy signals (Scp1, Scp2) for frequencies above a frequency threshold (Sf1),
g) filtering (502) an engine signal (Sb) for frequencies above the frequency threshold (Sf1).

11. The method as claimed in claim 9, further comprising, before step b), the steps of:
f) filtering (501) the first and second noisy signals (Scp1, Scp2) for frequencies above a frequency threshold (Sf1),
g) filtering (502) an engine signal (Sb) for frequencies above the frequency threshold (Sf1).

12. The circuit as claimed in claim 3, wherein the high-pass filter (425) has a cut-off frequency (Fc) lower than the minimum frequency of the useful frequency band of the signal (Sc) to be measured.

13. The circuit as claimed in claim 4, wherein the high-pass filter (425) has a cut-off frequency (Fc) lower than the minimum frequency of the useful frequency band of the signal (Sc) to be measured.

14. The circuit as claimed in claim 2, wherein an EMC filter (427) is connected in series with the common-mode voltage generation module (420).

15. The circuit as claimed in claim 3, wherein an EMC filter (427) is connected in series with the common-mode voltage generation module (420).

16. The circuit as claimed in claim 4, wherein an EMC filter (427) is connected in series with the common-mode voltage generation module (420).

17. The circuit as claimed in claim 2, wherein:
the output (S1) of the first operational amplifier (411) of the differential amplifier (410) is connected to the first input (E1−) of said first operational amplifier (411) via a negative feedback loop comprising a capacitive element (412) connected in parallel with a resistance (413), and
the output (S2) of the second operational amplifier (415) of the differential amplifier (410) is connected to the first input (E2−) of said second operational amplifier (415) via a negative feedback loop comprising a capacitive element (416) connected in parallel with a resistance (417).

18. The circuit as claimed in claim 3, wherein:
the output (S1) of the first operational amplifier (411) of the differential amplifier (410) is connected to the first input (E1−) of said first operational amplifier (411) via a negative feedback loop comprising a capacitive element (412) connected in parallel with a resistance (413), and
the output (S2) of the second operational amplifier (415) of the differential amplifier (410) is connected to the first input (E2−) of said second operational amplifier (415) via a negative feedback loop comprising a capacitive element (416) connected in parallel with a resistance (417).

19. The circuit as claimed in claim 4, wherein:
the output (S1) of the first operational amplifier (411) of the differential amplifier (410) is connected to the first input (E1−) of said first operational amplifier (411) via a negative feedback loop comprising a capacitive element (412) connected in parallel with a resistance (413), and
the output (S2) of the second operational amplifier (415) of the differential amplifier (410) is connected to the first input (E2−) of said second operational amplifier (415) via a negative feedback loop comprising a capacitive element (416) connected in parallel with a resistance (417).

\* \* \* \* \*